Patented Nov. 23, 1948

2,454,747

UNITED STATES PATENT OFFICE 2,454,747

MIXED ALKYL ESTERS OF ASCORBIC ACID

David I. Weisblat, Donald R. Myers, and Edwin C. Wise, Kalamazoo, Mich., assignors to The Upjohn Company, Kalamazoo, Mich., a corporation of Michigan No Drawing. Application April 16, 1945, Serial No. 588,722

5 Claims. (Cl. 260—344.5)

This invention relates to esters of ascorbic acid and is more particularly concerned with the oil soluble tetra esters of ascorbic acid in which the substituting groups comprise both lower and higher radicals of aliphatic acids.

A primary object of this invention is to provide a group of oil soluble derivatives of l-ascorbic acid which do not possess a bitter or unpalatable taste.

A further object is to prepare such derivatives which retain an anti-scorbutic action comparable to that of vitamin C.

Another object is to prepare derivatives of this type which are stable to oxidation.

Vitamin C, ascorbic acid, is a compound possessing high antiscorbutic activity and solubility in water. It has been found that esterification of one or more of the hydroxyl groups in ascorbic acid decreases the water solubility and at the same time increases the oil solubility.

Triacyl derivatives of ascorbic acid have been described in German Patent 639,776, prepared by the interaction of a sodium salt of ascorbic acid with the appropriate acid chloride at temperatures of 80° to 90° centigrade. This was extended to the aromatic series in Patent 2,150,140. However, only one of the hydroxyl groups in the enediol system is acylated by this method, and the reaction produces only low yields of the desired ester.

We have found that a completely acylated ascorbic acid can be prepared, comprising a mixture of lower and higher aliphatic acid radicals as the substituting groups. The preparation of fatty acid mono-esters of l-ascorbic acid is described in Patent 2,350,435. Using these mono-esters as a starting material, we were able to substitute lower-membered saturated aliphatic acid radicals for the three remaining hydroxyl groups. Acylation was accomplished by means of a catalyst, for instance zinc chloride. The use of zinc chloride as an acylation catalyst is well known to the art, but its application to ascorbic acid is unique. We experienced little difficulty in accomplishing complete acylation of the hydroxyl radicals, including those in the unstable enediol system of carbon atoms two and three. In some cases the high melting points of the reactants made it necessary to carry out the reactions at a relatively elevated temperature which caused marked decomposition. By using ether as an inert diluent, the heat of the reaction is absorbed and the temperature of the reaction is held thereby to a maximum of 35° centigrade, the boiling point of ether.

The compounds were obtained as crystals and could be purified by recrystallization from a petroleum naphtha. The physical properties of the compounds were determined and they were analyzed for carbon and hydrogen, the results corresponding substantially to the theoretical values.

The following examples are illustrative only of our invention:

Example 1

Five grams of fused zinc chloride was dissolved in 6.63 grams of acetic anhydride and this solution added to 50 milliliters of anhydrous ether in a reaction flask provided with a reflux condenser. To this flask was added 5.0 grams of monolauroyl-ascorbic acid and the solution was allowed to stand overnight, the ether in the solution maintaining the temperature of the solution below that at which decomposition occurs. After standing overnight, the solution was diluted with 150 milliliters of ether and this ether solution washed twice with ice water and then with distilled water until the washings were free of chlorides. The solution was then dried with sodium sulfate. Ether was distilled off in vacuo. This yielded 7.5 grams of crystalline material which was recrystallized from a petroleum naphtha to give 5.05 grams of product, representing a yield of 74.2 per cent based on the monolauroyl-ascorbic acid used.

The pure crystalline material had no bitter taste. It melted at 50° to 51° centigrade and had a specific rotation of 65.1° to the D line of sodium at 29° centigrade in a concentration of 3.01 grams of product in 100 milliliters of chloroform. An analysis was made on the basis of triacetyl, mono-lauroyl-ascorbic acid, $C_{24}H_{36}O_{10}$. Analysis showed carbon present as 59.66 per cent, corresponding substantially to the theoretical value of 59.49 per cent, and hydrogen as 7.74 per cent corresponding to the theoretical value of 7.49 per cent.

Example 2

Triacetyl, monostearoyl-ascorbic acid was prepared in substantially the same manner as outlined in Example 1. Seven grams of fused zinc chloride was dissolved in 6.3 grams of acetic anhydride in ether. Seven grams of monostearoyl ascorbic acid was added to this solution and it was allowed to stand overnight at room temperature. The product was a crystalline mass. This was dissolved in chloroform, washed with ice water and then with a 10 per cent solution of sodium bicarbonate. Chlorides were removed by washing with water. The ether solution was dried over anhydrous sodium sulfate, treated with activated charcoal, and ether distilled off in vacuo. This gave 7.68 grams of product which was then recrystallized from alcohol.

This compound was likewise substantially tasteless. The melting point of the purified product was 68° to 70° centigrade and the specific rotation was 50.8° to the D line of sodium in a concentration of 3.34 grams in 100 milliliters of chloroform.

*Example 3*

A therapeutic preparation was made from one of the above-named tetra esters dissolved in an oil solution. Ten milligrams of pure triacetyl, monolauroyl-ascorbic acid, melting at 50° to 51° centigrade, was dissolved in 1 gram of a cod liver oil concentrate having a potency of 50,000 United States Pharmacopoeia units of vitamin A and 5,000 U. S. P. units of vitamin D per gram. This composition is representative only and higher or lower concentrations of the tetra ester may be used. Feeding experiments showed that the ascorbic acid derivative retained substantially the potency of vitamin C.

Similar solutions may be prepared with diluents such as cod liver oil, fish liver oil and fish liver oil concentrates. Various other substituents may be added, such as other fat soluble vitamins, for oral use. These tetra esters may also be added to aqueous emulsions and suspensions. Crystalline tetra mixed esters of ascorbic acid, being stable to oxidation, retain anti-scorbutic potency when exposed to the air, where ascorbic acid loses its potency, and may therefore be used as a powdered solid, either alone or in soft elastic or hard capsules, or in combination as a nutritive addition to powdered food products, such as milk modifiers for baby foods or yeast extracts.

While we have specifically described certain representative members of our new class of compounds, other tetra mixed aliphatic acid esters may be prepared by the same procedure, possessing similar anti-scorbutic and oil soluble properties. Representative of such additional compounds are diacetyl-dilauroyl-ascorbic acid; diacetyl-distearoyl-ascorbic acid; and monoacetyl-trilauroyl-ascorbic acid. By the term "lower aliphatic acid radicals" as used herein is meant such radicals containing from two to seven carbon atoms, inclusive, and by the term "higher aliphatic acid radicals" is meant such radicals containing in excess of seven carbon atoms. All of the compounds above mentioned may be used as a substitute for vitamin C, retaining anti-scorbutic properties, and may be put into combination with the other oil soluble vitamins, such as vitamins A and D, in an oil solution.

We claim:

1. A tetra ester of ascorbic acid in which one of the ester groups is a lower fatty acid radical containing from 2 to 7 carbon atoms, inclusive, and one of the ester groups is a higher fatty acid radical containing more than 7 carbon atoms, the two remaining ester groups being selected from lower and higher fatty acid radicals.

2. Triacetyl, monolauroyl ascorbic acid.

3. Triacetyl, monostearoyl ascorbic acid.

4. A tetra fatty acid ester of ascorbic acid in which three of the substituting fatty acid radicals are lower fatty acid radicals containing from 2 to 7 carbon atoms, inclusive, and one of the substituting fatty acid radicals is a higher fatty acid radical containing more than 7 carbon atoms.

5. A tetra fatty acid ester of ascorbic acid in which three of the ester radicals are the acetate radical and one of the substituting fatty acid radicals is a higher fatty acid radical containing more than seven carbon atoms.

DAVID I. WEISBLAT.
DONALD R. MYERS.
EDWIN C. WISE.

REFERENCES CITED

The following references are of record in the file of this patent:

UNITED STATES PATENTS

| Number | Name | Date |
|---|---|---|
| 2,150,140 | Warnat | Mar. 7, 1939 |
| 2,185,383 | Pasternack et al. | Jan. 2, 1940 |
| 2,207,680 | Helferich | July 9, 1940 |
| 2,350,435 | Wells | June 6, 1944 |

FOREIGN PATENTS

| Number | Country | Date |
|---|---|---|
| 460,586 | Great Britain | Feb. 1, 1937 |
| 639,776 | Germany | Dec. 12, 1936 |

OTHER REFERENCES

Chemical Abstracts, 1935, page 737, "Methyl ethers of ascorbic acid."

Outline of Organic Chemistry, 4th ed., 1945, Degering, Barnes, and Noble, Inc., pages 89, 94–98.

Schuster, Arch. exptl. Path. Pharmakol., vol. 190, pages 392–405.

Micheel, Liebige Annalen, vol. 525, page 67.